United States Patent [19]

Ishikawa

[11] 4,365,607
[45] Dec. 28, 1982

[54] HOT-AIR INTAKE SYSTEM OF AN INTERNAL COMBUSTION ENGINE

[75] Inventor: Yoshikazu Ishikawa, Chofu, Japan

[73] Assignee: Nissan Motor Co., Ltd., Yokohama, Japan

[21] Appl. No.: 242,422

[22] Filed: Mar. 11, 1981

[30] Foreign Application Priority Data

Mar. 12, 1980 [JP]  Japan ............................ 55-32332[U]

[51] Int. Cl.³ ............................................. F02M 31/00
[52] U.S. Cl. ..................................... 123/556; 123/552
[58] Field of Search ............................ 123/556, 552;
236/101 D, 101 A, 101 C

[56] References Cited

U.S. PATENT DOCUMENTS 1,792,560  2/1931  Worbois .............................. 123/556
4,005,693  2/1977  Masaki et al. .
4,112,896  9/1978  Akado ................................ 123/556

FOREIGN PATENT DOCUMENTS 2028056  12/1971  Fed. Rep. of Germany .
2634223   2/1978  Fed. Rep. of Germany .
7632504   8/1979  Fed. Rep. of Germany .
1462067   1/1977  United Kingdom .

Primary Examiner—Ronald H. Lazarus

[57] ABSTRACT

A smaller diameter tube mounted to an air inlet tube of the air cleaner is disposed in a larger diameter tube mounted on an exhaust manifold cover with an adequate clearance therebetween, so that the heated air in the interior of the exhaust manifold cover is dischargeable to the open air through the clearance.

5 Claims, 3 Drawing Figures to be fed to the engine proper 14 passes.

HOT-AIR INTAKE SYSTEM OF AN INTERNAL COMBUSTION ENGINE

BACKGROUND OF THE INVENTION

The present invention relates to a hot-air intake system of an internal combustion engine, which system is constructed, for achieving a smoother operation of the engine even in cold weather season, to feed the engine with hot air which has been warmed at the outer surface area of the exhaust manifold.

SUMMARY OF THE INVENTION

It is an object of the present invention to provide a hot-air intake system of an internal combustion engine, which system is constructed to prevent the exhaust manifold from being extremely heated.

It is another object of the present invention to provide a hot-air intake system which is simple in construction and economical in production.

According to the present invention, there is provided a hot-air intake system of an internal combustion engine having an air inlet tube through which air to be fed to the engine proper passes and an exhaust manifold through which the combusted gas from the engine proper passes before discharging to the open air. The hot-air intake system comprises first means defining in the air inlet tube a first opening for ambient air and a second opening for hot air, second means for changing the ratio of the opening degree of the first opening and that of the second opening in accordance with the temperature of ambient air, an exhaust manifold cover covering the exhaust manifold with a clearance therebetween, the cover being formed with an opening, a first straight through tube connected at its one end to the opening of the cover and extending toward the second opening of the air inlet tube with its other end separated from the air inlet tube, and a second straight through tube disposed in the first straight through tube with a clearance therebetween, the second straight through tube having one end connected to the second opening of the air inlet tube and the other end exposed to the interior of the cover, so that the interior of the cover is in free communication with the open air through the clearance.

BRIEF DESCRIPTION OF THE DRAWINGS

Other objects and advantages of the present invention will become clear from the following description when taken in conjunction with the accompanying drawings, in which.

DETAILED DESCRIPTION OF THE PRESENT INVENTION

Figure 1:
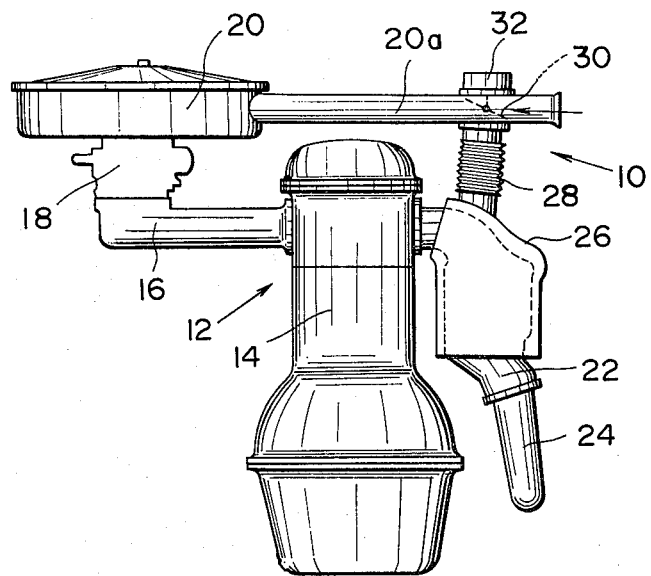
FIG. 1 is an illustration of a conventional hot-air intake system mounted to an internal combustion engine.

Prior to describing the invention, a conventional hot-air intake system will be outlined with reference to FIG. 1 in order to clarify the invention.

Referring to FIG. 1, there is shown a prior art hot-air intake system 10 which is mounted to a known internal combustion engine 12. The engine 12 comprises generally an engine proper 14, an intake system including an intake manifold 16, a carburetor 18 and an air cleaner 20, and an exhaust system including an exhaust manifold 22 and a tail pipe 24. The air cleaner 20 is provided with an air intake tube 20a through which air to be fed to the engine proper 14 passes.

The conventional hot-air intake system 10 comprises an exhaust manifold cover 26 which covers the exhaust manifold 22 with a suitable clearance therebetween. A tube 28 constructed of, for instance, a flexible heat-resisting member connects the interior of the cover 26 to the interior of the air intake tube 20a. A damper door 30 is swingably disposed in the air intake tube 20a at a position to selectively open and close the passage for heated-air from the cover 26 and the passage for ambient air. The swingable operation of the damper door 30 is controlled by a thermostatically controlled vacuum motor 32 so as to keep the air entering the carburetor 18 at a given temperature ranging, for example, from 40° C. to 50° C.

In the above-mentioned conventional hot-air intake system, however, the following problem tends to occur especially when the vehicle is running on a hot day. In fact, under cruising on a hot day, the damper door 30 is kept to completely close the passage of the heated-air from the exhaust manifold cover 26 thereby causing stagnation of the heated-air within the cover 26. Thus, the exhaust manifold 22 is extremely heated promoting oxidation thereof, and thus the life of the manifold 22 is shortened. Further, using the expensive flexible heat-resisting member as the heated-air transmitting conduit causes high cost production of the hot-air intake system.

It is therefore an essential object of the present invention to provide an improved hot-air intake system which is free of the above-mentioned problems.

Figure 2:
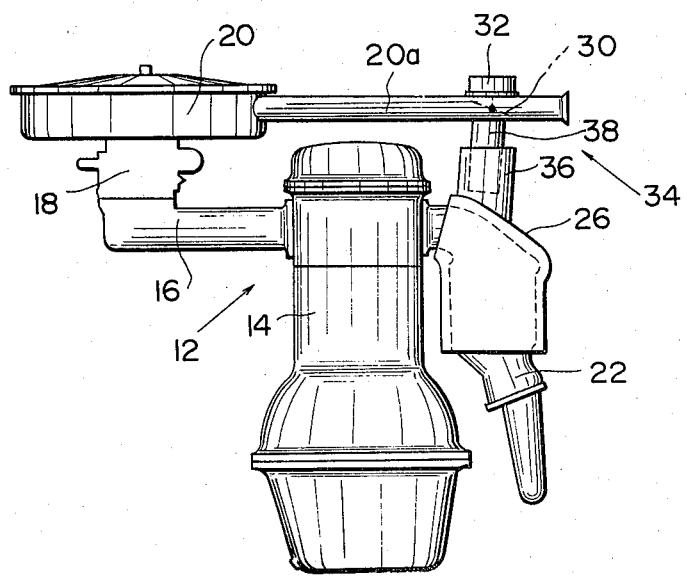
FIG. 2 is an illustration similar to FIG. 1, but shows an embodiment of the present invention.
Figure 3:
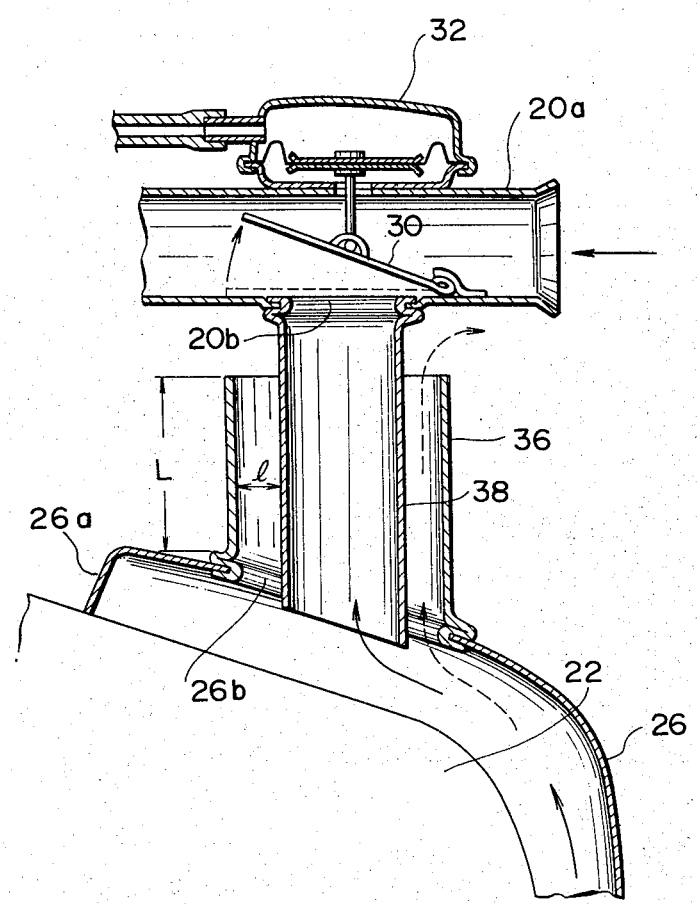
FIG. 3 is a sectional view of an essential part of the hot-air intake system of the present invention.

Referring to FIGS. 2 and 3, there is shown a hot-air intake system 34 according to the present invention, which is mounted to the internal combustion engine 12. Similar parts to those of FIG. 1 are designated by the same numerals and the detailed description of them is omitted from the following description.

The hot-air intake system 34 comprises an exhaust manifold cover 26 covering the exhaust manifold 22 with a suitable clearance therebetween. As will be seen from FIG. 3, the cover 26 has at its upper section a wall 26a which closes the clearance between the cover 26 and the exhaust manifold 22. Although not shown in the drawings, the lower end of the cover 26 is spaced from the outer surface of the exhaust manifold 22 for free communication between the interior of the cover 26 and the open air surrounding the cover 26. The cover 26 is formed with a circular opening 26b at its upper portion. A first straight cylindrical tube 36 is mounted on the cover 26 to connect to the opening 26b. Coaxially disposed in the first tube 36 to form a tubular clearance therebetween is a second straight cylindrical tube 38 which is greater in length but smaller in diameter than the first tube 36, the thickness of the clearance being designated by reference "l". As is well shown in FIG. 3, the upper end of the second tube 38 is secured to the air cleaner air inlet tube 20a to connect to an opening 20b which is closable by the damper door 30, and the lower end of the second tube 38 projects slightly into the interior of the cover 26. Preferably, these tubes 36 and 38 are vertically arranged upon assemblage thereof. For the reason which will become clear hereinafter, the length "L" of the first tube 36 and the thickness "l" of the clearance between the first and second tubes 36 and 38 are so determined as to produce a sufficient "stack effect" at the clearance upon flowing of the heated air therethrough.

In operation, when the damper door 30 closes the opening 20b because the ambient air temperature is sufficiently high, the heated-air in the cover 22 is discharged to the open air through the tubular clearance formed between the first and second tubes 36 and 38, ventilating the interior of the cover 26 with fresh cool air, in the manner as indicated by the dotted line arrows in FIG. 3. Thus, the undesirable overheat phenomenon of the exhaust manifold 22 does not occur.

When the damper door 30 opens the opening 20b to a considerable extent, the heated-air in the cover 22 is introduced into the air cleaner air inlet tube 20a through the second tube 38 as indicated by the real line arrows. Now, it should be noted that, under this condition, the heated-air discharged through the tubular clearance is negligible because the feeding of the heated-air to the inlet tube 20a is made enforcedly by air suction effect produced by the operating engine. Thus, heat-loss of the heated-air caused by the provision of the tubular clearance which constantly communicates the interior of the cover 26 to the open air is negligible.

Further, in the invention, there is no need for a flexible tube member as the above-mentioned conventional one because there is no construction of directly transmitting the vibration of the exhaust manifold cover to the air inlet tube 20a. Thus, economical production is available in the invention.

What is claimed is:

1. A hot-air intake system of an internal combustion engine having an air inlet tube through which air to be fed to the engine proper passes and an exhaust manifold through which the combusted gas from the engine proper passes before discharging to the open air, said hot-air intake system comprising:

first means defining in said air inlet tube a first opening for ambient air and a second opening for hot air;

second means for changing the ratio of the opening degree of the first opening and that of the second opening in accordance with the temperature of ambient air;

an exhaust manifold cover covering said exhaust manifold with a clearance therebetween, said cover being formed with an opening;

a first straight through tube connected at its one end to the opening of said cover and extending toward the second opening of said air inlet tube with its other end separated from the air inlet tube; and a second straight through tube disposed in said first straight through tube with a clearance therebetween, said second straight through tube having one end connected to the second opening of said air inlet tube and the other end exposed to the interior of said cover, so that the interior of said cover is in free communication with the open air through said clearance.

2. A hot-air intake system as claimed in claim 1, in which said exhaust manifold cover has a wall which closes said clearance near the opening of said cover.

3. A hot-air intake system as claimed in claim 1, in which said first and second straight through tubes are of cylindrical member.

4. A hot-air intake system as claimed in claim 3, in which said second straight through tube is concentrically disposed in said first straight through tube.

5. A hot-air intake system as claimed in claim 4, in which said second straight through tube is longer than said first straight through tube.

* * * * *